United States Patent
Sharpe et al.

(10) Patent No.: US 7,461,099 B1
(45) Date of Patent: Dec. 2, 2008

(54) METHOD AND SYSTEM FOR ARCHIVING AND RETRIEVING ITEMS BASED ON EPISODIC MEMORY OF GROUPS OF PEOPLE

(75) Inventors: Elizabeth Sharpe, Edinburgh (GB); John Leslie Fraser, Edinburgh (GB)

(73) Assignee: 6S, Limited, Edinburgh (GB)

( * ) Notice: Subject to any disclaimer, the term of this patent is extended or adjusted under 35 U.S.C. 154(b) by 862 days.

(21) Appl. No.: 09/670,635

(22) Filed: Sep. 26, 2000

(51) Int. Cl.
    *G06F 17/30* (2006.01)
(52) U.S. Cl. .............................. 707/204; 707/3; 707/10
(58) Field of Classification Search ............. 707/104.1, 707/204, 1, 3, 4, 204.1, 10
    See application file for complete search history.

(56) References Cited

U.S. PATENT DOCUMENTS

| | | | |
|---|---|---|---|
| 5,485,611 A * | 1/1996 | Astle ............................... | 707/1 |
| 5,493,677 A | 2/1996 | Balogh et al. ................ | 395/600 |
| 5,526,520 A | 6/1996 | Krause ........................ | 395/600 |
| 5,630,121 A * | 5/1997 | Braden-Harder et al. .... | 707/102 |
| 5,706,457 A | 1/1998 | Dwyer et al. ................ | 395/349 |
| 5,715,445 A | 2/1998 | Wolfe ......................... | 395/605 |
| 5,828,904 A * | 10/1998 | Batson et al. ................ | 709/102 |
| 5,835,667 A | 11/1998 | Wactlar et al. ................ | 386/96 |
| 5,842,009 A * | 11/1998 | Borovoy et al. ................ | 707/1 |
| 5,943,670 A * | 8/1999 | Prager ........................... | 707/5 |
| 5,991,758 A | 11/1999 | Ellard ........................... | 706/6 |
| 6,119,133 A | 9/2000 | Nusbickel et al. ........... | 707/205 |
| 6,438,539 B1 * | 8/2002 | Korolev et al. ................. | 707/3 |

FOREIGN PATENT DOCUMENTS

| | | |
|---|---|---|
| EP | 0 637 807 | 2/1995 |
| EP | 0 637 807 A2 | 2/1995 |
| EP | 0 678 816 A2 | 10/1995 |

(Continued)

OTHER PUBLICATIONS

Shneiderman et al. (Direct Annotation: A Drag-and-Drop Strategy for Labeling Photos, Aug. 2000.*

(Continued)

*Primary Examiner*—John Breene
*Assistant Examiner*—Baoquoc N. To
(74) *Attorney, Agent, or Firm*—Kenyon & Kenyon LLP (57) ABSTRACT

A method and system for archiving and retrieving digital media items based on episodic memory of predefined associated groups of one or more people comprises: receiving an input identifying a group to which the user belongs; receiving user archiving input identifying a digital media item to be archived for the group, selecting zero or more group event types from a predetermined plurality of group event tapes for the group, selecting zero or more persons in the group, and selecting a time; generating index information using the received user archiving input; storing the indexed information in association with the identified digital item; repeating the reception of user archiving input, the generation of the index information and the storing of the index information for a plurality of digital media items; receiving a user retrieval input selecting or automatically selecting: zero or more groups of event types from the predetermined plurality of group event types for the group, zero or more persons in the group, and a time period; and using the selections and the identified group to retrieve and output digital media items that match the selection.

37 Claims, 8 Drawing Sheets

FOREIGN PATENT DOCUMENTS

| | | |
|---|---|---|
| EP | 0 717 346 A2 | 6/1996 |
| EP | 1 004 967 A1 | 5/2000 |
| EP | 1 074 923 A2 | 2/2001 |
| WO | WO 99/19816 | 4/1999 |
| WO | WO 00/30000 | 5/2000 |
| WO | WO 00/51342 | 8/2000 |
| WO | WO 01/80080 A2 | 10/2001 |
| WO | WO 01/80081 A2 | 10/2001 |

OTHER PUBLICATIONS

Alexander C. Loui and Mark D. Wood, A Software System For Automatic Albuming Of Consumer Pictures, pp. 159-162.

K. Priyantha Hewagamage and Masahito Hirakawa, Augmented Album: Situation-dependant System For A Personal Digital Video/ Image Collection, pp. 323-326.

* cited by examiner

| GROUP IDENTIFIER | PEOPLE |
|---|---|
|  |  |
|  |  |

Fig 6a

| GROUP IDENTIFIER | ITEM IDENTIFIER |
|---|---|
|  |  |
|  |  |

Fig 6b

| ITEM IDENTIFIER | HIGH POINT FLAG |
|---|---|
|  |  |
|  |  |

Fig 6c

| TRAIL IDENTIFIER | FIRST ITEM IDENTIFIER | SECOND ITEM IDENTIFIER | THIRD ITEM IDENTIFIER |
|---|---|---|---|
|  |  |  |  |
|  |  |  |  |
|  |  |  |  |

Fig 6d

| ITEM IDENTIFIER | MEDIUM TYPE | PEOPLE | TIME | EVENT TYPE |
|---|---|---|---|---|
|  |  |  |  |  |
|  |  |  |  |  |
|  |  |  |  |  |

| item | | | focus | | | | |
|---|---|---|---|---|---|---|---|
| | associated information | | | | | | |
| medium type | people | time | event type | people | time | event type | shift? | notes |
| image | Sonia, Cheryl | 4 May 98 | party | any | 1998 | Party | ✓ | initial focus |
| sound | Tana | 4 May 98 | party | | | | | |
| sound | Cheryl, Caitlin | 4 May 98 | party | | | | | |
| video | Sonia | 4 May 98 | party | | | | | |
| text | Sonia | 4 May 97 | party | Sonia | any | party | ✓ | focus changes onto a person; same event type |
| sound | Sonia, Cheryl | 3 Jan 97 | party | | | | | |
| image | Sonia, Cheryl, Tana | 14 Mar – 18 Mar 97 | school trip | Sonia | spring 97 | Any | ✓ | focus changes onto a period; same person |
| image | Sonia | 3 Apr 97 – 10 Apr 97 | vacation | | | | | |
| text | Sonia | 15 Apr 97 | date | | | | | |
| sound | Sonia | 13 Oct 99 | date | Sonia | any | date | ✓ | focus changes onto an event type; same person |
| image | Sonia | 13 Oct 99 | date | | | | | these 3 items are a high point (no special order) |
| text | Sonia | 13 Oct 99 | date | | | | | |
| image | Caitlin, Sonia | 12 Jan 96 | date | | | | | |
| image | Sonia, Cheryl, Caitlin, Tana | 2 Jan 96 | show | Caitlin | Jan 96 | any | ✓ | focus changes onto a person and a time period |
| text | Sonia, Cheryl, Caitlin, Tana | 2 Jan 96 | show | | | | | these 4 items in this sequence are a trail |
| image | Sonia, Cheryl, Caitlin, Tana | 29 Jan 96 | get-together | | | | | |
| audio | Sonia, Cheryl, Caitlin, Tana | 29 Jan 96 | get-together | | | | | |
| image | Sonia, Cheryl, Tana | 30 Jan 96 | school outing | Sonia, Cheryl | Jan 96 | get-together | ✓ | this focus is narrow (people, time and event type all specified) |
| ... | ... | ... | ... | ... | ... | ... | ... | ... |
| image | Cheryl | 4 Oct 997 | dance | any | 1997 | any | ✓ | focus can be broad (people or time or event type) |

Fig 8

METHOD AND SYSTEM FOR ARCHIVING AND RETRIEVING ITEMS BASED ON EPISODIC MEMORY OF GROUPS OF PEOPLE

The present invention generally relates to the archiving and retrieval of digital media items wherein the archiving and retrieval process is performed based on episodic memory of predefined groups of people.

Storage and archiving techniques for digital media and corresponding retrieval techniques are well known. However, the work in this field is concentrated on facilitating the retrieval of a particular digital media item i.e., one which matches the user's requirements exactly. The prior art archiving and retrieval systems are based on a semantic memory approach. Such an approach is suited to the location of items relevant to a specific requirement.

The present invention provides a different approach to the archiving and retrieval of digital media items of any type. The invention is based on the fact that groups of people now readily establish archives of digital media items that reflect their activities, relationships and interests. The archiving and retrieval system of the present invention is designed for use by strong social groups, such as those formed by teenage girls, families, work mates, or sports teams or clubs. The invention can also be used by individuals to archive and retrieve digital media items relating to a group of people. The invention is based on the realisation that people in creating these digital archives, are establishing group "memory" and indulging in group nostalgia. Tools bases on episodic memory rather than semantic memory will be more effective and desirable for these purposes.

In accordance with a first aspect of the present invention, there is provided a method and apparatus for archiving and retrieving digital media items in which the archiving and retrieval process is based on the common episodic memory of a strong social group. To archive digital media items, a user identifies a group to which the user belongs. If it is used by an individual, the individual may set up a group but only the individual uses the system. In this case the archiving and retrieval is based on the episodic memory of the individual in relation to the activities of the group. Once the user has identified the group to which the user belongs, one or more digital media items to be archived for the group can then be identified. The digital media item to be archived may either already have been stored in an archive or may get stored in the archive as part of the archiving process. In order to archive the digital media item, a user can select to index the digital media item using finite sets of enumerate parameters. More specifically these comprise group event types to which the media item relates, persons associated with the digital media item, and a time period associated with the digital media item. The user wishing to archive the digital media item can thus select zero or more group event types, zero or more persons in the group and a time which can be defaulted to a default "no time" or to the current date. Using these three parameters index information for the digital media items is generated and stored in association with the digital media items. For retrieval, a user can manually select the three parameters or they can be automatically generated. Thus a user can select zero or more group event types, zero or more persons and a time period. The manually or automatically selected parameters are then used to retrieve digital media items. The automatic generation of parameters enables random reminiscence through archived digital media items by group members.

The use of time, people and event types as the three fundamental indices for archiving and retrieval provides a simple user friendly method of archiving material since this is based on the way people remember things. The application of these indices to a group with shared experience limits the number of people and event types needed for indexing or retrieving the digital data items. This facilitates a simple user interface such as a pull down menu on a Graphical User Interface (GUI) to allow selection of a person and event type from all possible people and event types and to allow selection of a particular time. The time used for indexing can comprise not just a specific time such as a date, but a time period such as a range of dates e.g., 17th to 24 Jul. 2000 or August 2000.

Because the collection and indexing of the digital media items is based on the episodic memory of the group, i.e. they have chosen the material and indexed it according to its relevance to them, the retrieval and browsing through data digital items are attuned to the memories of the user. The aim of retrieval is not to retrieve a specific digital media item but instead to retrieve any digital media items relating to a memorable episode. Thus the indexing system does not uniquely identify digital media items, but replaces them within a highly personal framework. For example, even if a specific photograph were required, it would be remembered through the event and hence retrieved by searching on the event or the person. Thus the archive may contain many commonly indexed images taken at the same time period involving the same people at the same event.

When a group is set up, a group identifier is assigned so that all digital media items archived for that group can be associated to the group in the archive. A user setting up a group can select a number of group members and a number of group event types which are relevant to the episodic memory of the group. Members of the group can be changed and event types can be changed thus modifying the indexing of the archived digital media items. This allows flexibility since members of social groups do not always remains fixed. The event types for different social groups can be determined prior to use depending on the typical shared experiences of the group, e.g. family, friends, sports team or club, or sales organisation.

The digital media items to be archived can be already archived digital media items to which the index information can be associated. Alternatively, the digital media items could be retrieved from another stored location for example on a CD ROM or on a web site or the digital media item could be generated e.g., by typing text which provides a text item, recording sound to provide an audio item, using a drawing package to create an image item, talking or scanning pictures to generate image items or inputting digital video images to provide video items. In a preferred embodiment, a user is provided with the capability to obtain digital media items of any media type from any location.

The user may also be provided with the ability to manipulate the digital media item e.g. edit the text item, or modify an image using an image processing application.

In one embodiment the user is given an option to designate a particular digital media item as comprising a "high point". This enables a user to flag the digital media item as being associated with a particularly memorable event. The digital media item is thus flagged as being of an important category. Judicious use of this feature will allow these particularly significant items of digital media to be retrieved more readily.

As a further aid to retrieval, in one embodiment, the media type of multimedia digital media items is used as a further index. The media type can either be identified automatically or the user can select the media type. This enables a user to specify a media type of items which are to be retrieved.

In another embodiment of the present invention, a user may define a "rail". A trail is a logical or meaningful route through an archive of digital media items as perceived by the user. The user is thus able to select digital media items and select the order of the digital media items in a trail. The fact that the digital media items belong to the trail and the order of the digital media items in the trail are stored as part of the index for the digital media items. Retrieval of a trail of digital media items enables a user to experience a particular memory trail. For example, a particular digital media item comprises a digital photograph of a party. At the party a particular song was played a large number of time and came to be closely related with that party in the minds of those who attended. Consequently, when the item is retrieved it will strengthen the recollection about that party if a trail is provided to a digital media file containing for example the chorus of that particular song. The retrieval and outputting of digital media items in the trail can either be performed automatically i.e., providing the user with all digital media items in a trail if one digital media item in a trail is selected, or manually i.e., by indicating to a user that one of the retrieved digital media items is part of a trail to allow the user to follow that trail. In this way the nostalgic experience provided by the episodic retrieval system is enhanced.

An embodiment of the present invention additionally provides the ability to provide the user with a serendipitous nostalgic experience. A user may select the automatic retrieval and browsing of digital media items. As an initial query for retrieval, a time, period, one or more event types, and one or more people are automatically randomly selected. This forms an initial "focus" for a search. The focus is analogous to that on a camera whereby a wide focus draws in many items while a narrow focus reveals a smaller number of items. Having performed an initial retrieval based on the initial focus, the focus can be shifted e.g. by simply changing one of the parameters to retrieve different digital media items and thus take the user on a nostalgic trip. Alternatively, the focus can be broadened or narrowed. Since the focus indicates the breadth of indexing, the indexing fields for time, people and event types can be broadened or narrowed to broaden or narrow the focus of the search. For example a wide focus might comprise a time range of the year 1999, a people range of everybody in the group, an event range of parties or gigs. A narrower focus may comprise a time range of August 1999, either of two people in the group, and an event type comprising a school outing.

The present invention is not just applicable to the archiving and retrieval of digital media items for leisure purposes. The present invention can be used in a business context. For example it can be used as a brain-storming aid by an individual or a group. The system will be useful in trying to retrieve digital media items related to a memorable episode such as a particular meeting which took place with particular people on a particular date. The meeting may have e-mails, letters, and presentations associated with it. The system will allow members of the group to archive and retrieve digital media items relating to such a meeting using parameters which mimic their memory process.

A second aspect of the present invention provides a method and apparatus for archiving a digital media item in which index information is generated by allowing a user to identify a time, at least one person from a predetermined plurality of people, and an event type from a predetermined plurality of event types; and storing the index information in association with the digital media item.

The index information may be stored together with the digital media item for example as a "header". Alternatively, the digital media items may be stored separately with unique identifiers such as a file name or index. The index information then carries a reference to this unique identifier. The index information may be stored separately from the digital media items in a faster storage medium. This allows the digital mediabase to be searched quickly but does not use the expensive, fast access storage for space consuming digital media files.

In accordance with a third aspect, the present invention provides a method of retrieving a digital media item from a database, the method comprising identifying a digital media item within the database; automatically identifying another digital media item within the database; and retrieving that other digital media item. The other digital media item can be identified via a previously stored association with the first mentioned digital media item, or the other digital media item can be identified at random. The previously stored association can indicate that the digital media items have at least one common characteristic. The further digital media item can be retrieved automatically or can be identified to the user that there is another digital media item which can then be selected by the user.

The present invention can be implemented on a stand alone processing apparatus or over a network. The database of index information and digital media items may not be physically located with the processing apparatus which is used by a user. In one embodiment the present invention is implemented over the Internet using the World Wide Web. A server provides the functionality to interface the digital media item database and the index information database to users. The users can access the server using a conventional web browser running on a computer or a Web TV. Alternatively, the user may use a mobile device using a suitable protocol such as the Wireless Application Protocol (WAP) for accessing the server. The digital media items can be input to the user's device e.g. by typing or reading digital media files. These can then be uploaded to the server for archiving. Alternatively, the user may access digital media items over the Internet for archiving.

Conveniently the present invention can be implemented on any suitable processing apparatus by processor readable code. The Code can be provided to the processing apparatus on any suitable carrier medium such as a storage device (e.g. floppy disk, CD ROM, programming memory device, or tape device), or signal, such as an electronic signal carried over a network such as the Internet. Thus the processor readable and executable code can be provided to a suitable processing apparatus on such a carrier medium in order to implement the method and system of the present invention.

Embodiments of the present invention will now be described with reference to the accompanying drawings in which.

Figure 1:
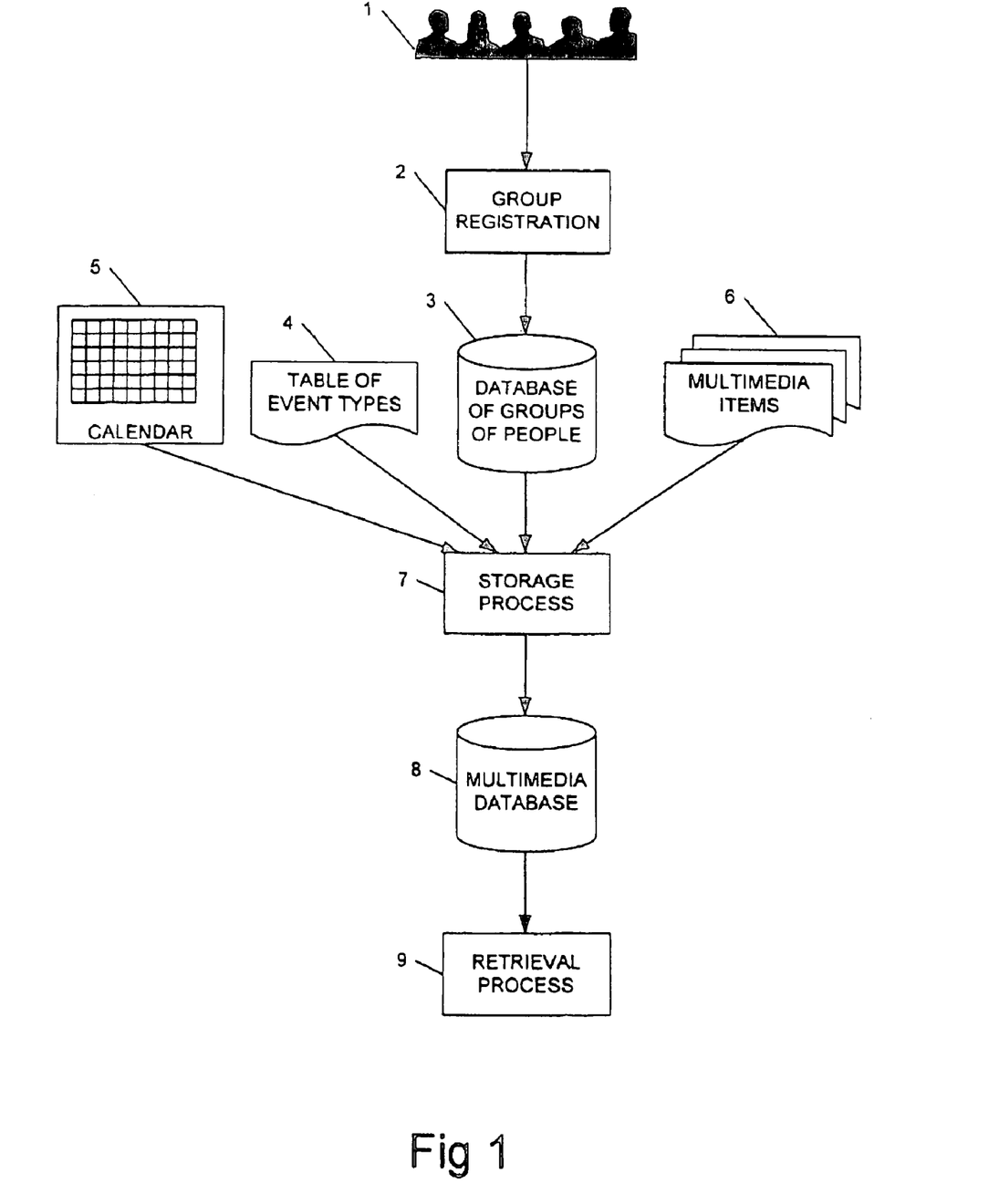
FIG. 1 is a block diagram giving an overview of the present invention.

FIG. 1 shows a block diagram of an overview of an embodiment of the present invention in which groups of users 1 are registered by a group registration process 2 in a database 3. It is assumed that the members of the private group work together (or an individual works independently but uses digital media items related to other users) to identify, collect, translate or create digital media items in different media e.g., favorite phrases, photographs, verses of poetry, recordings of their own voices, clips of home videos, or clips from their favorite music. These items collectively represent the culture of the group or individual. The items may all be in the same medium, e.g. photographs or music recordings. The items can be archived and at a later time individuals in the group or the group as a whole can reminisce and review the contents of the archive.

The group registration process 2 is preferably only performed once although it is possible to update the groups over time. It is preferred to keep this activity to a minimum however to ensure a database meaningful to the group is constructed. An example of a necessary modification to the group is when a new baby joins a family. The storage process 7 is responsible for associating, with each item to be stored, an identifier and any other associated information for the index. The storage process 7, which will be described in more detail hereinafter, comprises identifying a group of people from the database 3, identifying one or more multimedia items to be archived 6 with index information, selection of an event type from a table of possible event types for the group of people 4 and selecting a date from the calendar 5. Also individuals within the group identified on the database 3 are selected using the database 3 for association with the selected item or items. Thus the storage process 7 indexes one or more multimedia items in accordance with the group, members of the group, one or more event types, and a date. Also, the storage process 7 can further index the multimedia items to give details of high points and trials as will be described in more detail hereinafter.

The result of the storage process is stored or archived multimedia items, high points, trails and the index of associated information. The multimedia database can be structured so that the multimedia items are stored separately to the index data.

The retrieval process 9 allows the digital media items to be retrieved and displayed as will be described in more detailed hereinafter.

Figure 2:
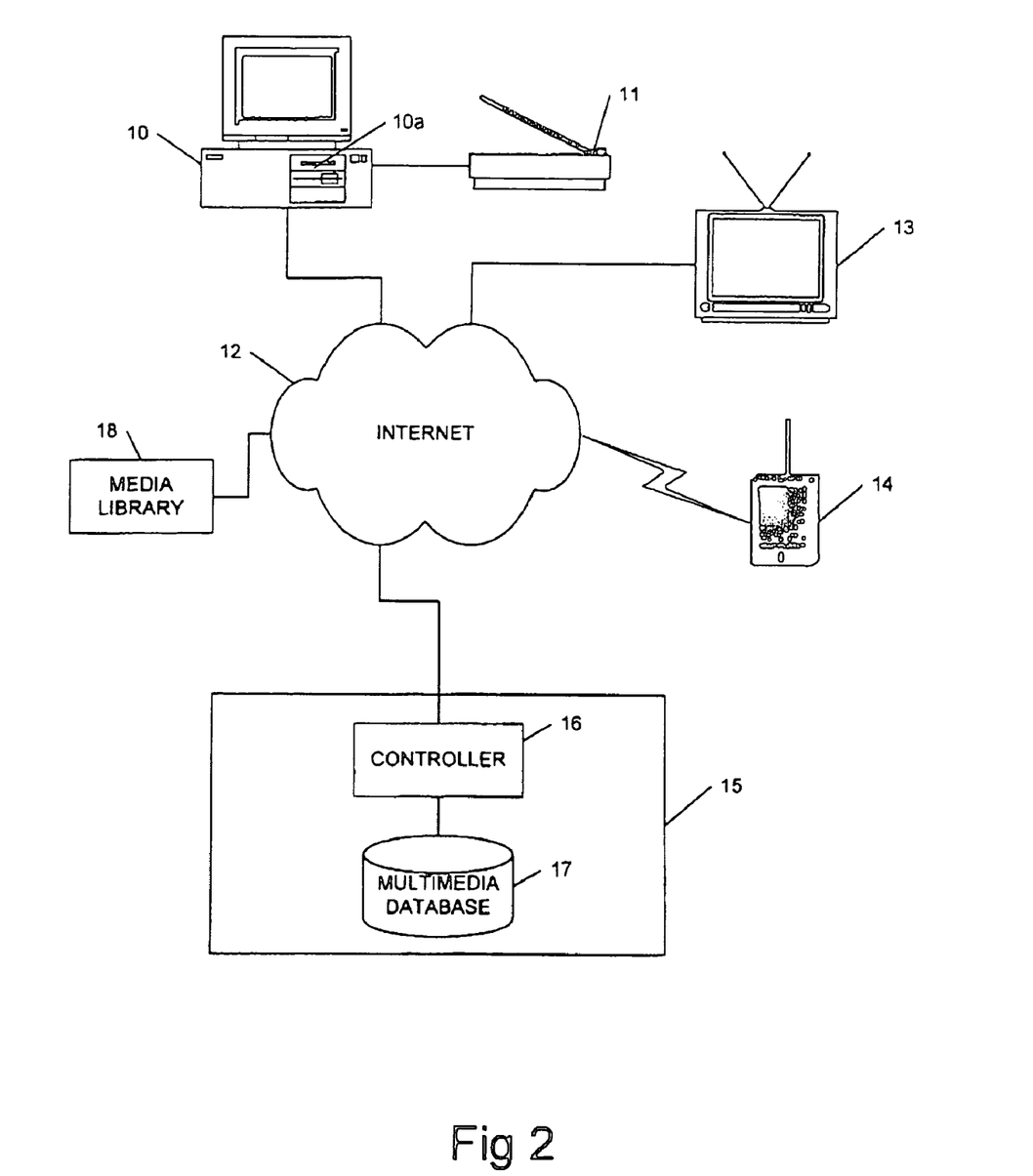
FIG. 2 is a schematic block diagram of a network arrangement of processing apparatuses implementing embodiments of the present invention.

FIG. 2 is a schematic diagram of a network demonstrating embodiments of the present invention. The embodiments of the present invention are implemented using the Internet 12 to communicate between the user device 10, 13 or 14 and the remote server 15. The user's devices 10, 13 and 14 are connected to the server 15 over the Internet 12. The user's device can comprise a general purpose computer 10 provided with a scanner 11 and a disk drive 10a (e.g. floppy, CD or DVD). This enables a user to input media items into the computer 10 either by scanning images or text or by inputting text, audio, image or video files on a disk using the disk drive 10a. Alternatively, the user's device can comprise a web-TV 13 or a WAP enabled mobile device such as a mobile phone or personal digital assistant (PDA) 14.

The server 15 comprises a controller 16 and the multimedia database 17. The controller comprises a web server to provide the necessary web interface for the users, and a database interface for accessing the multimedia database 17.

Another source of media items for a user is a media library 18 such as a web site which is connected to the internet 12. A user can thus access media items at the media library 18 over the Internet 12 and archive these in the multimedia database 17 at the server 15 for later retrieval.

The multimedia database 17 can archive single medium or multimedia media items. The content comes from the medium or media which surround the members of the group e.g. films, music, mimicry and sayings (from actors, the group members etc.), TV adverts, TV programmes, books, plays, books, photographs from personal events like dances, school trips, holiday and parties. The user's can create some of the items themselves and obtain some items from on-line libraries such as the media library 18. Examples of library material are:

music samples
advertising (not necessarily targeted at the users)
film and TV including clips from classic films, TV series and soap operas
books such as text from drama, fiction and poetry
mimicry, impersonations of any of the above.

It is envisaged that the service will be most applicable to groups of teenage girls, women and families who will maintain and access the group archives over long periods of time. However, it is also applicable to individuals. An individual or a small group with access to a single machine may use a local storage medium such as a hard disk drive.

Figure 3:
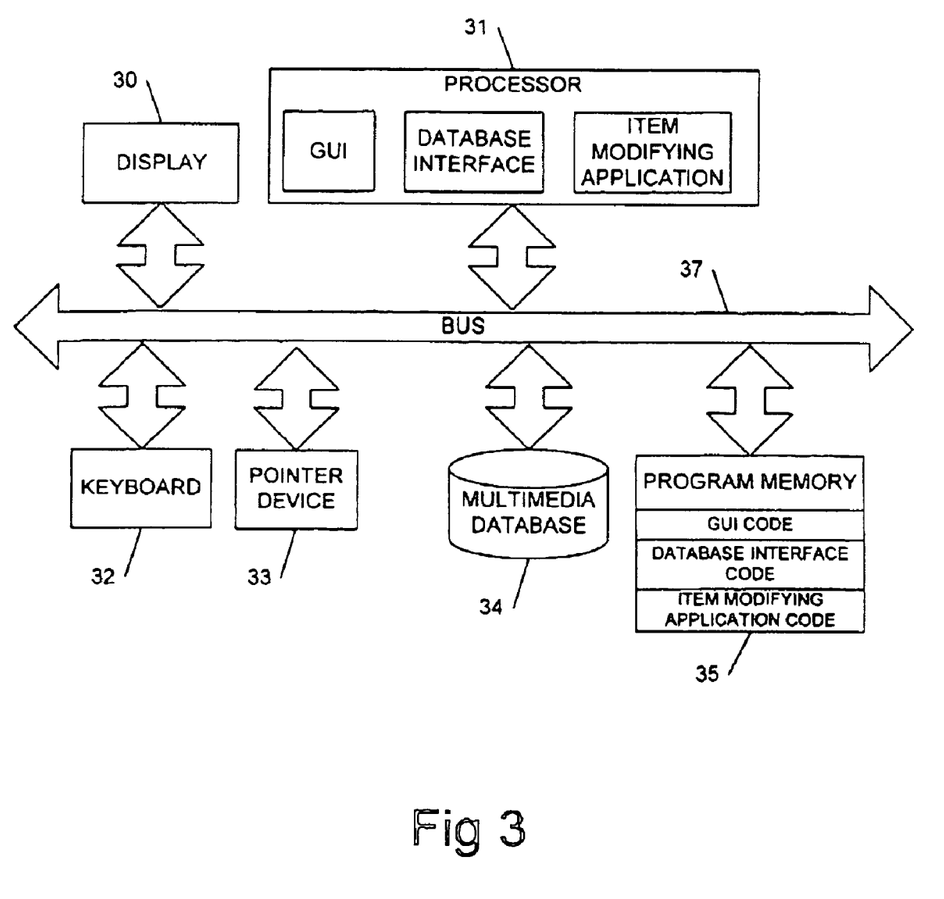
FIG. 3 is a schematic block diagram of a stand alone embodiment of the present invention.

FIG. 3 shows a schematic diagram providing local storage as mentioned hereinabove. The diagram illustrates schematically the architecture of a general purpose computer. The computer is provided with a display 30 for displaying options to a user and for displaying the media items. A keyboard 32 is provided for inputting text and a pointing device such as a mouse 33 is provided to allow user selections. A multimedia database 34 is provided stored on a suitable storage medium such as a hard disk drive or CD ROM. Programme memory 35 is provided storing computer code for implementation by a processor 31. The programme memory 35 stores graphical user interface code for implementation by the processor 31 for providing a graphical user interface on the display 30. Database interface code is stored for providing a database interface to the multimedia database 34 for the retrieval and storage of media items. Also the programme memory 35 stores media item modifying application code for implementing a media item modifying application to allow a user to modify media items for archiving all the components. All the components of the computer are interconnected by a control and data bus 37.

The present embodiment of the present invention is described with reference to groups of teenage girls. The present invention is also suitable for groups of women and families. Further, the invention is also expected to be useful for other types of private social groups such as work mates, sports teams or clubs and even individuals. Each type of group will have different sets of event types that are relevant to them. For example, for teenage girls the event types can comprise: party, holiday, dance, gig, show, school trip, date.

Figure 4:
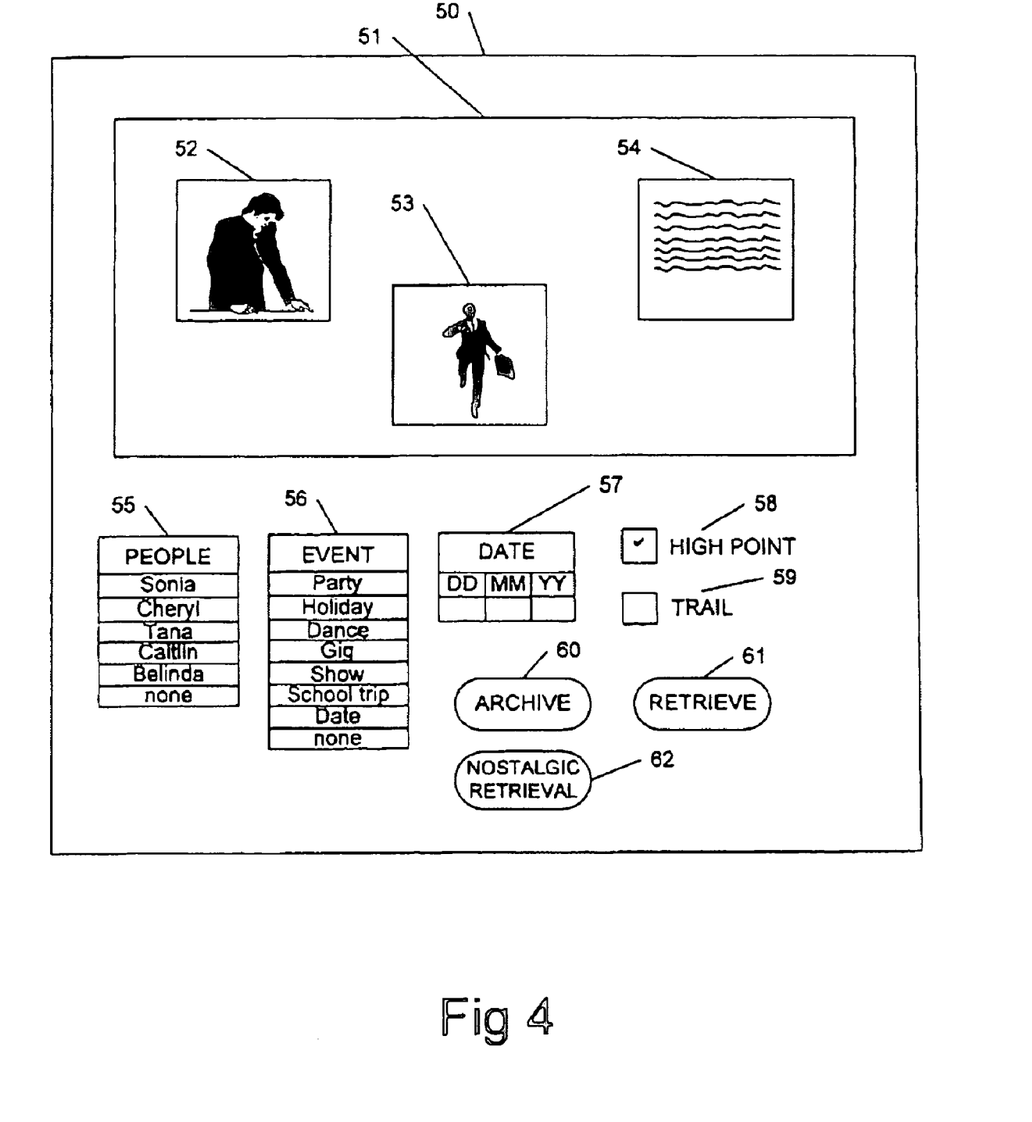
FIG. 4 is a diagram of the graphical interface in accordance with an embodiment of the present invention.

FIG. 4 is a diagram of a graphical user interface 50 which is displayed to the user in this embodiment. An area of the display is provided as a work space 51. In this work space media items such as images 52 and 53 and text item 54 can be placed using known computing techniques. Thus the media items represented in the work space 51 can be archived. The work space 51 can also be used for displaying retrieved media items. Beneath work space 51 are user controls for generating index information for archiving or for generating a query when retrieving. A drop down box 55 is provided for selecting any of a number of people within the group. A drop down box 56 is provided for identifying one of a number of event types. A date entry 57 is provided to enable a user to enter a date. (A second date entry, not shown in FIG. 4, is also provided for retrieval of media items, to allow the entry of both the start and end dates of a time period.) If no date is entered, either today's date or a default "no date" is used for the query. Also the date entry field can be used incomplete. For example is no day is specified, month and year only will be used. Also if no day or month is specified then only the year will be used for the query. A check box 58 is also provided to enable selection of a high point and a similar check box 59 is provided to enable to designation of a trail. When the interface is used for archiving, any of the media items on the work space 51 can be selected e.g. by pointing and clicking, and if the high point check box 58 is checked and the archive button 60 is selected, the media item will be archived with the selected people, event type and date selection and will be marked as a high point. Similarly the trail check box 59 is checked and a number of media items are selected in the work space 51, if the archive button 60 is selected, a user will be given an option to identify the sequence of media items in the trail and then the media items will be archived with indexes indicating the order in the trail.

A retrieve button 61 is also provided to enable retrieval of items in accordance with the criteria of people, event type, date, high point and trail. There is also provided a button for a nostalgic retrieval where retrieval takes place automatically to provide a serendipitous nostalgic experience for the user. The storage and retrieval processes will be described in more detail hereinafter.

The process of storage will now be described in more detail with reference to the flow diagram of FIG. 5 and the tables of FIGS. 6a, 6b, 6c, 6d and 6e.

Figure 6A:
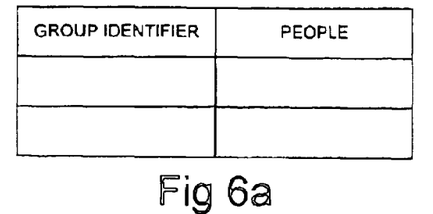
FIGS. 6a, 6b, 6c, 6d and 6e illustrate the tables of the index information stored in the database in accordance with an embodiment of the present invention.
Figure 6B:
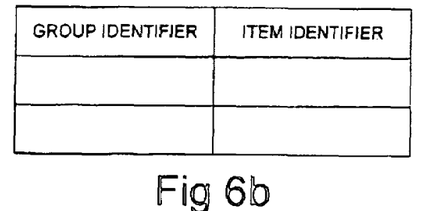

Before the storage process begins, when the registration process (2 in FIG. 1) is carried out by a member or members of the groups, information is stored in a group table 6a. A group identifies a group and people in the group are identified. When a user wishes to use the system they will enter a user name and password thus identifying themselves as a member of a group.

Once the user has logged on and the user wishes to archive data, in step 71 media items 72 are imported onto the work space 51. At this point identifiers of the new items are generated and in step 73 the new items are stored. This causes the storage of the item identifier in the group table shown in FIG. 6a. The items stored are associated to the group to which the user belongs.

In step 74 the user will select whether or not the item comprises a high point. If the user selects the item as a high point representing a particularly memorable event, in step 75 the high point information is stored in the table illustrated in FIG. 6c. A high point flag is stored together with the item identifier. First the users have the opportunity to state whether the item, either on its own or with other items is a "high point". The user can thus decide whether the media item holds some special significance e.g. the last day of the group's last day in school, the first date of the quietest member of the group.

In step 76 the user can then decide whether media items displayed in the work space comprise a sequence of items that constitute a special trail that links them in some meaningful way. For instance:

1. An image depicts a still scene from a film

2. A sound clip repeats a catch phrase from the film as spoken by one of the actors 3. Another sound clip repeats the catch phrase in the voice of a school teacher 4. An image depicts a caricature of the teacher.

Figure 6C:
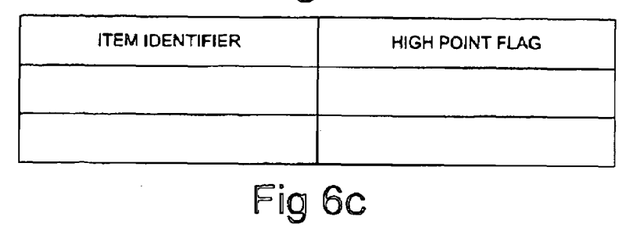
Figure 6D:
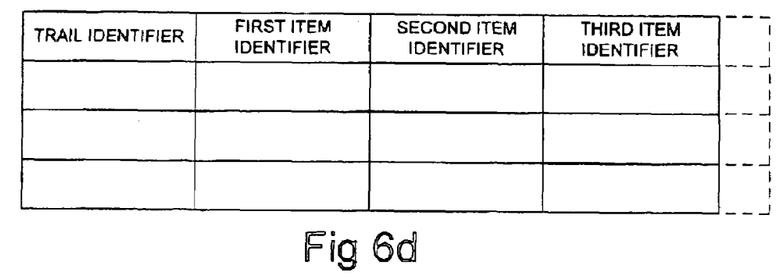

If the user selects to store the media items as a trail, in step 77 the user selected sequence of items in the trail is stored in the trail table illustrated in FIG. 6d in the database. Each trail is given an individual identifier and each media item in the trail is identified by its item identifier in the sequence in the trail.

Figure 5:
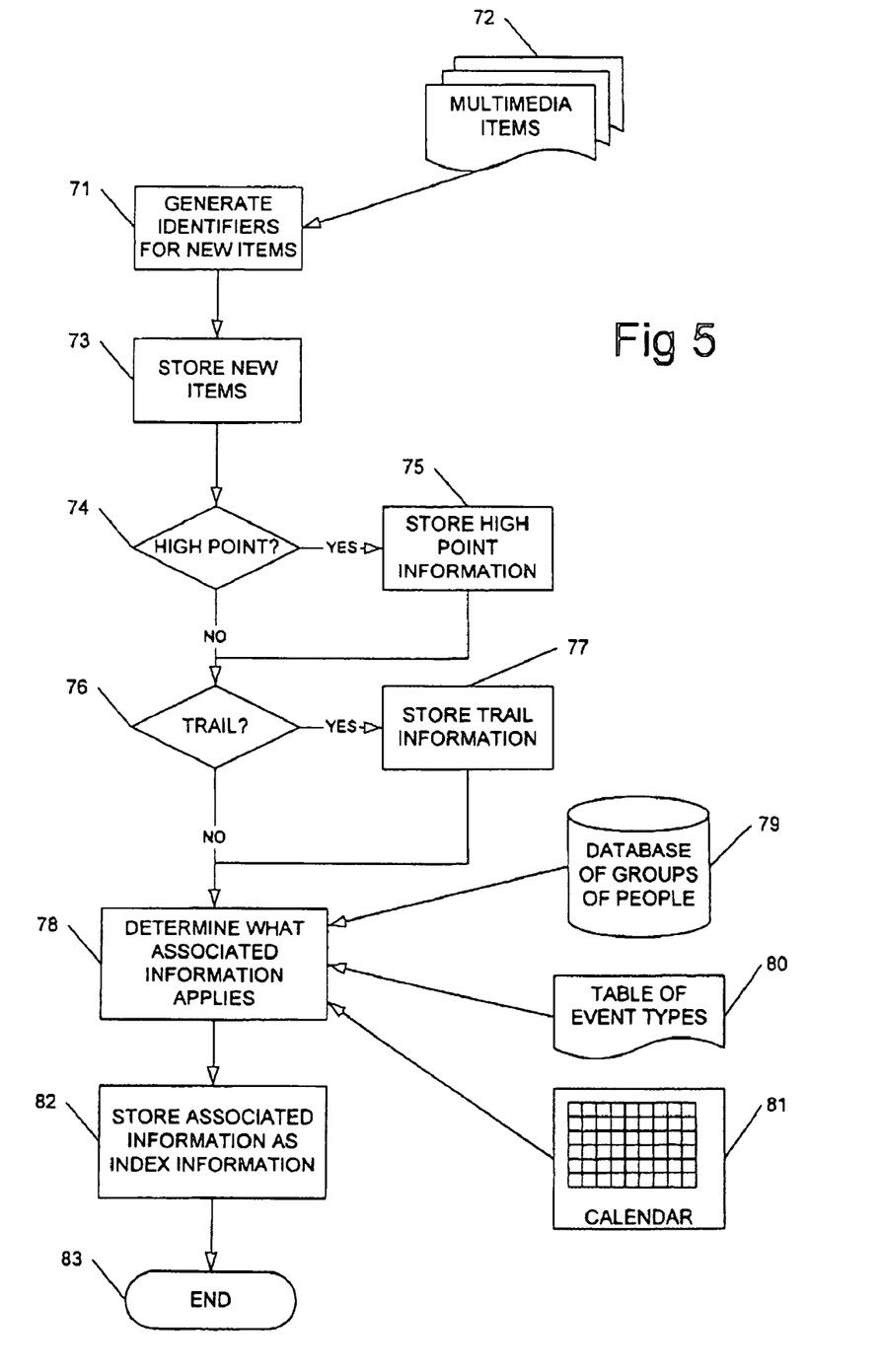
FIG. 5 is a flow diagram of the archiving process in accordance with an embodiment of the present invention.

It can be seen from FIG. 5 and FIGS. 6c and 6d that the media item that is a high point can also comprise a media item in a trail.

In step 78 the users are given the opportunity to indicate which, if any, information is to be associated with each stored item. As illustrated in the graphical user interface of FIG. 4, the user can select:

which, if any the registered people are to be associated, which, if any of the event types are to be associated, which, if any, date is to be associated. If the user declines to suggest the date then the current date can automatically be associated or alternatively no date can be associated.

The database of groups of people 79 is thus used to provide the list of people. The table of event types 80 is used to provide the event types available for each group. The calendar 81 is used to provide relevant dates.

Figure 6E:
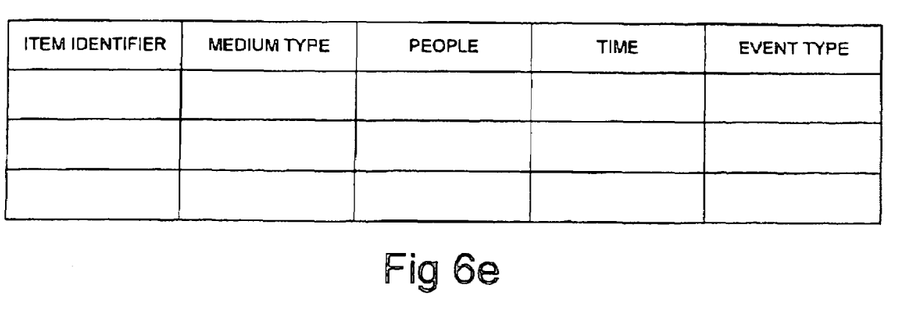

The determined associated information is then stored in step 82 as index information as illustrated in FIG. 6e. Each item is identified by an item identifier, the medium type of each item is identified. This can either be automatically determined or a user can define the medium type. The people time and event type associated with each item are stored in the table linked to the item identifier.

The archiving process is then completed in step 83. Using this process the archive can gradually be built up over time with many media items, some of them grouped as high points, some of them forming parts of trails and some of them indexed on associated information.

The retrieval process will now be described with reference to the flow diagram of FIG. 7.

At some point in time following the storage, members will wish to delve into the contents of the group archive. They might want to do this to have fun, to settle arguments, to reminisce, to experience a stream of items as a changing backdrop to other activities, to tidy up or to add new items.

The methods of retrieval in this embodiment are:

1. Experience items of the same medium type or types

2. Experience high points

3. Follow predefined trails

4. Experience items with certain focus

5. Engage in serendipitous nostalgia

6. Dip in at random.

The user can choose the particular method to be used at any time. It is assumed that there is always a focus in this embodiment determined either by the user or automatically. The focus can be one or more of:

one or more people date or time period an event type.

The focus can be empty meaning that no person, time or event type has been specified. In this case all items in the database for a group are within focus.

Any combination of the retrieval methods can be used. The retrieval will depend upon the retrieval parameters selected by the user as illustrated in the graphical user interface of FIG. 4. The parameters can comprise the associations people, event type or date, high point, trial or a medium type. (The GUI of FIG. 4 does not show a means by which a user can select a medium type. Any suitable means can be used).

Figure 7:
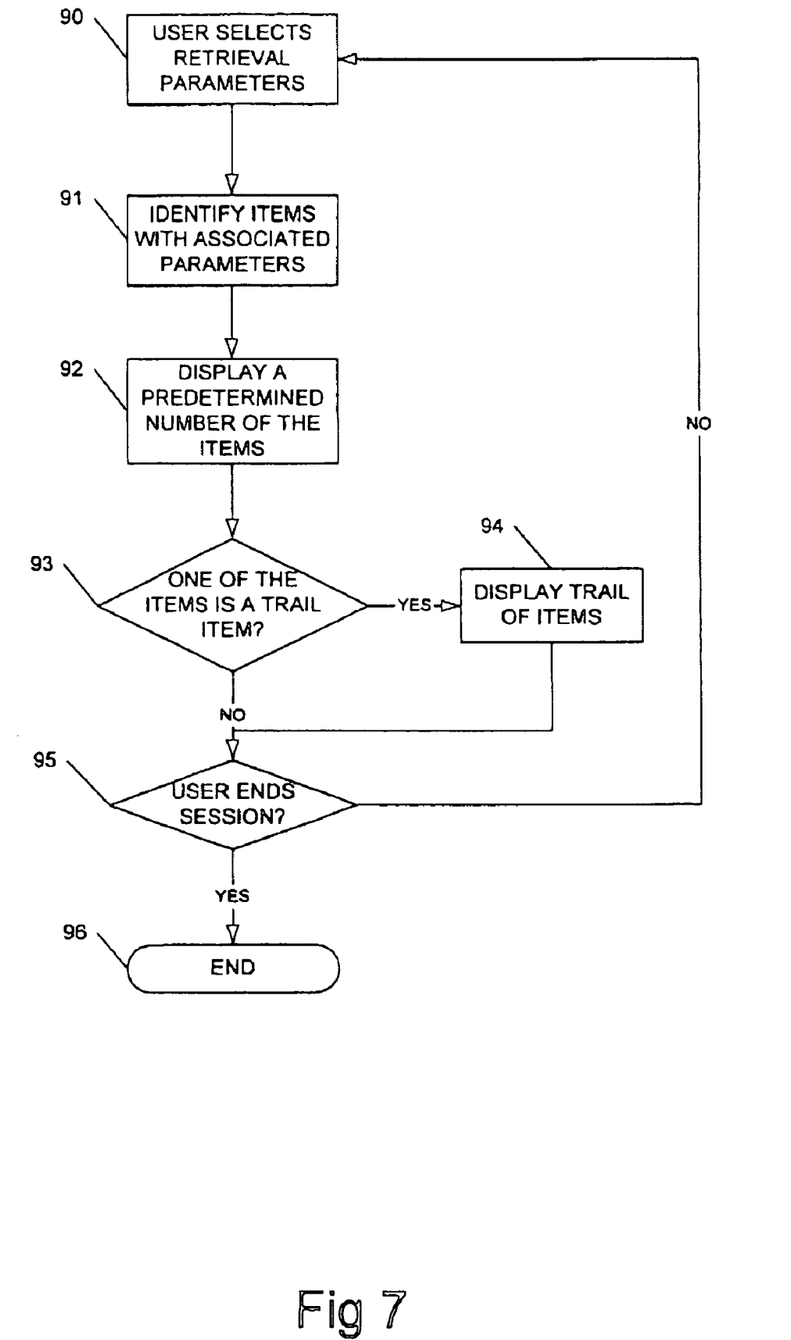
FIG. 7 is a flow diagram of the retrieval process in accordance with an embodiment of the present invention.

The flow diagram of FIG. 7 illustrates the retrieval process. In step 90 a user selects the retrieval parameters and in step 91 items are identified with the associated parameters. In step 92 a predetermined number of the items are displayed. If a large number of items are identified, in order to avoid clutter of the work space 51, the number of items displayed can be limited. An indication that there are more items can be displayed to allow the user to select the display of the further items. In step 93, it is determined whether one of the displayed items is a trail item. If so, in step 94 the items in the trail are displayed. This can either take place automatically or a user can be given a notification that there is a trail to follow from a specific displayed item to allow the user to select to follow that trail and to display the items. In this way the user can undergo a nostalgic experience following the trail of media items.

In step 95 it is then determined whether the user has ended the session and if so the process is terminated in step 96. Otherwise the process returns to step 90. A selection of new retrieval parameters is made.

Figure 8:
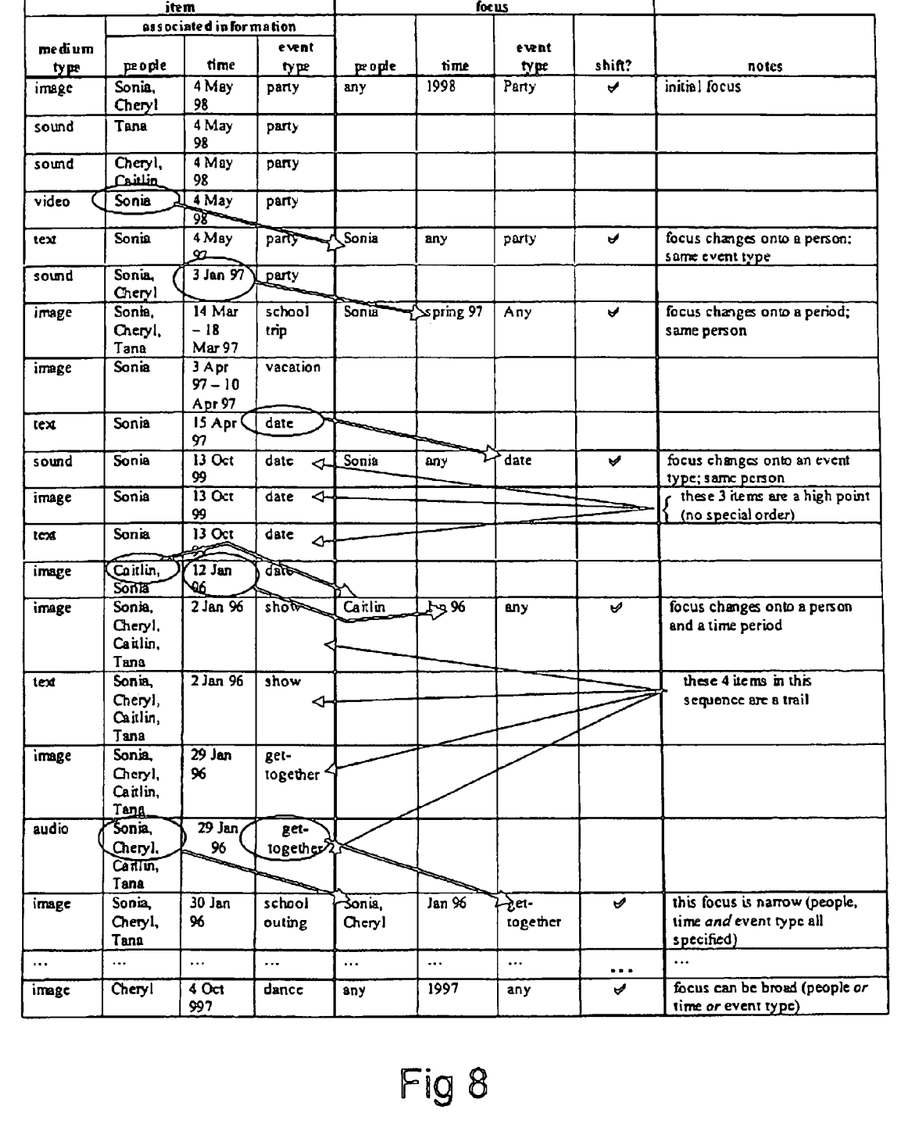
FIG. 8 is a table illustrating the serendipitous nostalgic process in accordance with an embodiment of the present invention.

As illustrated in the graphical user interface in FIG. 4, a user can select to retrieve using nostalgic retrieval. This will result in a serendipitous nostalgia process resembling how one would browse through a box of old photographs or personal diaries: a start point may be chosen at random, or on the basis of a person, time (period) or event. Reviewing one or more items about that person, time or event a trigger is found in one of the items to a different association and a new sequence of associated items is reviewed. For example when looking at items relating to Summer 1998, the picture of one of the group brings to mind an 18th birthday in which that person made a fool of herself. Finding the diary in which the party is described the focus moves to a different event also described in the diary which took place around that time, and so the nostalgic trip continues with random length sequences focusing on items that are associated in one way, followed by a shift in focus and a new sequence of items. FIG. 8 shows an example of a serendipitous nostalgic journey. The first four columns show the items retrieved in sequence while the 5th to 7th columns show the current focus. Whenever the focus shifts, it is indicated in the 8th column. The arrow shows how the new focus is generated. The journey encounters both a high point and a trail, both of which are shown in the table.

Thus the serendipitous nostalgia retrieval process comprises identifying an initial focus comprising the parameters people, event type, and date. This can be randomly determined. An initial set of media items are retrieved using the initial focus. After that one or a number of the parameters are changed to change the focus and the new parameters are used for retrieving media items. There are many ways in which the focus can be automatically shifted. Table 1 below identifies some possible focus shifts in the serendipitous nostalgia retrieval process.

TABLE 1

Some possible focus shifts in serendipitous nostalgia

| change | example |
| --- | --- |
| narrow the focus by one level | if the old focus has no restriction on time period, then include a time period in the new focus |
| broaden the focus by one level | if the old focus specifies an event type, let the new focus have no restriction on event type |
| narrow the people focus | add more people |
| broaden the people focus | remove some of existing people |
| narrow the time focus | reduce the time period from a year to a season, from a season to a month, etc. |
| make a small focus shift | make people focus narrower or broader by just one person |
| make a large focus shift | select completely new people |
| make a larger focus shift | select completely new people and a different event type |
| make the largest shift | select new people, a different time period and a different event type |

There is also much scope for strategies for making successive focus shifts over time. Some possibilities are shown in table 2 below.

TABLE 2

Some strategies for shifting focus

Strategy alternate broadening and narrowing the focus
broaden and narrow the focus at random
alternate small focus shifts and large focus shifts
small and large focus shifts at random
rotate focus shifts by people, time and event types
choose randomly between changing people, time and event types
make shifts according to observed behaviour of different kinds of groups The user may also wish to dip into the archive "at random". This may mean literally at random i.e., each item is selected with no reference whatever to the previous one. This is easy for the retrieval process 10 handle.

It may alternatively mean that they want to see successive items that are as different as possible from each other. In this case the retrieval process can ensure the largest "distance" between two successive items, based on the associated information of the respective items. For instance items with non overlapping people are further away than those with overlapping people; items with different event types are further away than those with the same event types; the difference in times give a direct measure of item distance.

It would be apparent to the skilled person in the art that modifications can lie within the spirit and scope of the present invention.

The invention claimed is:

1. A method of archiving and retrieving digital media items, comprising
   receiving a user input identifying a group of users to which an archiving user belongs;
   receiving archiving input data identifying: a digital media item to be archived for the group, the user's selection of zero or more group event types from a predetermined plurality of group event types specific to the group, the user's selection of zero or more persons in the group, and the user's selection of a time period;
   generating index information using the received user archiving input;

storing the index information in association with the identified digital media item;

repeating the reception of archiving input data, the generation of the index information and the storing of the index information for a plurality of digital media items;

receiving retrieval input data representing a selection of a default or zero or more group event types from the predetermined plurality of group event types for the group, a selection of a default or zero or more persons in the group, and a selection of a time period; and using the selections and the identified group to retrieve and output digital media items that match the selection.

2. A method according to claim 1 wherein the retrieval input data comprises a user input from another user identifying a group to which the other user belongs and the digital media items are retrieved using the group identified for the other user in the user retrieval input.

3. A method according to claim 1 including defining the distinct groups of people, and defining group event types that are appropriate for members of the groups to distinguish episodic events memorable to the group.

4. A method according to claim 1 including receiving said digital media item to be archived, and storing said digital media item in association with the index information.

5. A method according to claim 1 including receiving archiving input data identifying a digital media item as being associated with a memorable high point in the mind of the user.

6. A method according to claim 5 wherein the retrieval input data includes an input selecting memorable high points.

7. A method according to claim 1 wherein the index information includes an identification of a media type of the digital media item.

8. A method according to claim 7 wherein the retrieval input data includes an input identifying a media type, and the digital media items are retrieved and output based on the identified media type.

9. A method according to claim 1 including receiving archiving input data identifying a plurality of digital media items and an input identifying the digital media items to be associated as perceived by the user, wherein the index information is generated to include the identified association.

10. A method according to claim 9 wherein, when digital media items are retrieved and output as a result of the user retrieval input, any digital media items having the identified association in the index information are automatically identified for retrieval and output.

11. A method according to claim 10 wherein the automatically identified digital media items are automatically retrieved and output.

12. A method according to claim 10 including outputting a notification to a user that associated digital media items are available, and retrieving and outputting automatically identified digital media items in response to a user input.

13. A method according to claim 1 further comprising:
receiving a user request for automatic nostalgic retrieval,
automatically generating an initial set of said selections,
using the selections to retrieve and output digital media items,
automatically modifying one or more of the selections,
using the modified selections to retrieve and output digital media items and
repeating the modifying, and retrieval and output steps.

14. A method of operating a terminal for use in the archiving and retrieval of digital media items for predefined distinct groups of people, the method comprising:
receiving from an archiving user archiving input data identifying:
a group to which the user belongs,
a digital media item to be archived for the group,
a selection of zero or more group event types from a predetermined plurality of group event types specific to the group,
a selection of zero or more persons in the group, and
a selection of a time period;
transmitting the archiving input to a processing device for generating index information using the archiving input and for storing the index information in association with the identified item;
receiving from a retrieving user retrieval input data identifying:
a group to which the user belongs,
a selection of default or zero or more group event types from the predetermined plurality of group event types for the group,
a selection of default or zero or more persons in the group, and
a selection of a time period;
transmitting the retrieval input to the processing device to identify digital media items using the retrieval input;
receiving any digital media items identified by the processing device; and
displaying the received digital media items.

15. A user terminal for use in the archiving and retrieval of digital media items associated with predefined distinct groups of one or more people, the terminal comprising:
user interface means for generating archiving input data identifying:
a group to which the user belongs,
a digital media item to be archived for the group,
a user selection of zero or more group event types from a predetermined plurality of group event types specific to the group,
a user selection of zero or more persons in the group, and
a user selection of a time period;
transmission means for transmitting the archiving input to a processing device for generating index information using the archiving input and for storing the index information in association with the identified item;
wherein said user interface means further is for generating retrieval input data identifying:
a group to which a retrieving user belongs,
a retrieving user's selection of a default or zero or more group event types from the predetermined plurality of group event types for the group,
a retrieving user's selection of a default or zero or more persons in the group,
a retrieving user's selection of a time period; and
said transmission means is adapted to transmit the retrieval input to the processing device to identify digital media items using the retrieval input;
the user terminal further including
receiving means for receiving any digital media items identified by the processing device; and
a display for displaying the received digital media items.

16. A storage device storing processor readable and implementable code for controlling a processor to carry the method of any one of claim 1 to 13 or 14.

17. Apparatus for archiving and retrieving digital media items for predefined distinct groups of one or more people, the apparatus comprising:
- receiving means for receiving archiving input data identifying a group to which the user belongs, the archiving input data identifying:
  - a digital media item to be archived for the group,
  - a selection of zero or more group event types from a predetermined plurality of group event types specific to the group,
  - a selection of zero or more persons in the group, and
  - a selection of a time period;
- generating means for generating index information using the received user archiving input;
- storing means for storing the index information in association with the identified digital media item;
- wherein said receiving means is adapted to receive retrieval input data identifying a manual or automatic selection of zero or more group event types from the predetermined plurality of group event types for the group, a selection of zero or more persons in the group, and a selection of a time or time period; and
- the apparatus further includes retrieval means for using the selections and the identified group to retrieve and output digital media items that match the selections.

18. Apparatus according to claim 17 wherein said receiving means is adapted to receive the retrieval input data from another user, said retrieval input data identifying a group to which the other user belongs.

19. Apparatus according to claim 17 including means for defining the distinct groups of people, and for defining group event types that are appropriate for members of the groups to distinguish episodic events memorable to the group.

20. Apparatus according to claim 17 wherein said receiving means is adapted to receive said digital media items to be archived, and item storing means for storing said digital media item in association with the index information.

21. Apparatus according to claim 17 wherein said receiving means is adapted to receive archiving input data identifying a digital media item as being associated with a memorable high point in the mind of the user.

22. Apparatus according to claim 21 wherein said receiving means is adapted to receive retrieval input data selecting memorable high points.

23. Apparatus according to claim 17 wherein said generating means is adapted to include an identification of a media type of the digital media item.

24. Apparatus according to claim 23 wherein said receiving means is adapted to receive retrieval input data identifying a media type, and said retrieval means is adapted to retrieve and output digital media items based on the identified media type.

25. Apparatus according to claim 17 wherein said receiving means is adapted to receive archiving input data identifying a plurality of digital media items to be sequenced as perceived by the user, and said generating means is adapted to generate the index information to include the identified sequences.

26. Apparatus according to claim 25 wherein said retrieval means is adapted to retrieve all digital media items identified to be sequenced when one or more digital media items are selected for retrieval.

27. Apparatus according to claim 17 wherein said receiving means receives a request for automatic nostalgic retrieval, said generating means is adapted to generate an initial set of selections and automatically modify one or more of the selections at a time in response to the request, said retrieval means is adapted to sequentially output digital media items retrieved using the generated and modified sets of selection.

28. A media archival method, comprising, under control of an operator who is a member of a group:
- authenticating an operator as a member of a group of users,
- identifying candidate identification values based upon the group with whom the operator is authenticated,
- querying the operator for selection of identification data to be associated with a digital media item, the query identifying the candidate identification values and including valid selections of an event type and persons from the group and time,
- generating index information from a response of the operator, and
- storing the index information in association with the digital media item.

29. The archival method of claim 28, wherein the candidate identification values for persons include names of group members.

30. The archival method of claim 28, wherein the stored index information includes a flag that distinguishes high point items from other items, and the method further comprises setting the flag if the operator response includes an indication that the digital media item is a high point.

31. The archival method of claim 28, wherein, if the operator response indicates that the digital media item is a member of a trail, the index information includes an identifier representing the media item's display position in a sequence of stored media items stored by the system.

32. A multimedia retrieval method, comprising, under control of an operator who is a member of a group:
- authenticating an operator as a member of a group of users,
- identifying candidate identification values based upon the group with whom the operator is authenticated,
- querying the operator for selection of identification data, the query identifying the candidate identification values and including valid selections of an event type and persons from the group and time,
- generating index information from a response of the operator, and
- retrieving stored media items corresponding to the index information.

33. The retrieval method of claim 32, wherein the candidate identification values for persons include names of group members.

34. The retrieval method of claim 32, wherein the stored index information includes a flag that distinguishes high point items from other items, and the method further comprises searching for the flag among the stored index information if the operator response includes an indication that high point items are selected.

35. The retrieval method of claim 32, further comprising, if the operator response indicates that a trail is selected, presenting stored media items in a sequence as identified in the index information corresponding to the presented media items.

36. A method of archiving digital media items, comprising:
- receiving a user input identifying a social group to which an archiving user belongs;
- building a database that includes:
  - digital media items to be archived for the social group, and
  - index information for the digital media items, each instance of index information created from archiving input data identifying a user's response to a query that identifies a plurality of event types previously registered as associated with the social group, and persons previously registered as members of the social group.

37. A method of searching digital media items, comprising:
receiving a user input identifying a social group for which a search is to be conducted;
identifying candidate identification values based upon the social group,
displaying a query that identifies the candidate identification values and including valid selections of an event type for the social group, persons from the social group and time,
responsive to selection criteria made in response to the query, searching a database and retrieving digital media items that satisfy the selection criteria.

* * * * *